US010519060B2

(12) United States Patent
Suesugi et al.

(10) Patent No.: US 10,519,060 B2
(45) Date of Patent: Dec. 31, 2019

(54) PROCESS FOR PRODUCING POLYMERIZABLE COMPOSITION FOR OPTICAL MATERIAL AND POLYMERIZABLE COMPOSITION FOR OPTICAL MATERIAL

(71) Applicant: Mitsui Chemicals, Inc., Minato-ku, Tokyo (JP)

(72) Inventors: Kouji Suesugi, Arao (JP); Naoki Shinohara, Tokyo (JP); Koju Okazaki, Ichihara (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 0 days.

(21) Appl. No.: 15/743,383

(22) PCT Filed: Aug. 5, 2016

(86) PCT No.: PCT/JP2016/073117
§ 371 (c)(1),
(2) Date: Jan. 10, 2018

(87) PCT Pub. No.: WO2017/022855
PCT Pub. Date: Feb. 9, 2017

(65) Prior Publication Data
US 2018/0194672 A1  Jul. 12, 2018

(30) Foreign Application Priority Data

Aug. 6, 2015 (JP) .................................. 2015-155710
Aug. 6, 2015 (WO) ................. PCT/JP2015/072332

(51) Int. Cl.
| G02B 1/14 | (2015.01) |
| C03C 3/12 | (2006.01) |
| C08G 18/38 | (2006.01) |
| G02B 1/04 | (2006.01) |
| G02B 1/111 | (2015.01) |
| G02C 7/02 | (2006.01) |
| C08G 18/24 | (2006.01) |
| C08G 18/73 | (2006.01) |
| C08G 18/75 | (2006.01) |
| C08G 18/76 | (2006.01) |

(52) U.S. Cl.
CPC .............. *C03C 3/12* (2013.01); *C08G 18/242* (2013.01); *C08G 18/38* (2013.01); *C08G 18/3876* (2013.01); *C08G 18/73* (2013.01); *C08G 18/755* (2013.01); *C08G 18/758* (2013.01); *C08G 18/7621* (2013.01); *C08G 18/7657* (2013.01); *G02B 1/04* (2013.01); *G02B 1/041* (2013.01); *G02B 1/111* (2013.01); *G02B 1/14* (2015.01); *G02C 7/02* (2013.01); *C08G 2120/00* (2013.01)

(58) Field of Classification Search
USPC .............................................. 528/48, 44, 46
See application file for complete search history.

(56) References Cited

U.S. PATENT DOCUMENTS

| 5,059,673 A | 10/1991 | Kanemura et al. |
| 5,087,758 A | 2/1992 | Kanemura et al. |
| 5,191,055 A | 3/1993 | Kanemura et al. |
| 5,608,115 A | 3/1997 | Okazaki et al. |
| 5,837,797 A | 11/1998 | Okazaki et al. |
| 6,100,362 A | 8/2000 | Okazaki et al. |
| 7,932,327 B2 | 4/2011 | Kohgo et al. |
| 8,222,366 B2 | 7/2012 | Ryu et al. |
| 8,304,506 B2 | 11/2012 | Ryu et al. |
| 8,455,610 B2 | 6/2013 | Ryu et al. |
| 8,461,238 B2 | 6/2013 | Kawato et al. |
| 2009/0099329 A1 | 4/2009 | Ryu et al. |
| 2009/0227745 A1 | 9/2009 | Kohgo et al. |
| 2009/0264613 A1† | 10/2009 | Kuma |
| 2014/0296431 A1 | 10/2014 | Kousaka |

FOREIGN PATENT DOCUMENTS

| JP | 2-270859 A | 11/1990 | |
| JP | 3-124722 A | 5/1991 | |
| JP | 7-252207 A | 10/1995 | |
| JP | 8-208794 A | 8/1996 | |
| JP | 10-39102 A | 2/1998 | |
| JP | 2001-31646 A | 2/2001 | |
| JP | 2011-231305 A | 11/2011 | |
| JP | 2012-82415 A | 4/2012 | |
| JP | 2012-82416 A | 4/2012 | |
| JP | 2013-60488 A | 4/2013 | |
| JP | 2014-104738 A † | 6/2014 | |
| WO | 2006/109765 A1 | 10/2006 | |
| WO | WO 2007/020817 A1 | 2/2007 | |
| WO | 2007/096425 A2 | 8/2007 | |
| WO | 2011/055540 A1 | 5/2011 | |
| WO | 2013039114 * | 1/2013 | ............. G02B 1/041 |
| WO | WO 2013/032010 A1 | 3/2013 | |
| WO | 2013/073194 A1 † | 5/2013 | |

OTHER PUBLICATIONS

WO2013039114 Okamoto Yasuhisa et al. Method for producing urethane optical member. 2013 Translation.*
Office Action issued by the Japanese Patent Office in corresponding Japanese Patent Application No. 2017-533138 on Jul. 24, 2018 (5 pages).
Extended Search Report issued by the European Patent Office in corresponding European Patent Application No. 16833134.6-1107 dated Dec. 13, 2018 (5 pages).

(Continued)

Primary Examiner — Terressa Boykin
(74) Attorney, Agent, or Firm — Buchanan, Ingersoll & Rooney PC

(57) ABSTRACT

A process for producing a polymerizable composition for an optical material of the present invention includes a step of mixing (A) at least one kind of thiol compound having at least two mercapto groups, (B) a tin compound represented by general formula (1), and (C) at least one kind of isocyanate compound having at least two isocyanato groups, in which the polymerizable composition for an optical material obtained in the above step has a haze value of 0.05 or less.

$$(R^4)_c\text{—Sn—}X_{4-c} \qquad (1)$$

18 Claims, No Drawings

(56) References Cited

OTHER PUBLICATIONS

International Search Report (PCT/ISA/210) dated Oct. 18, 2016, by the Japanese Patent Office as the International Searching Authority for International Application No. PCT/JP2016/073117.

\* cited by examiner
† cited by third party

PROCESS FOR PRODUCING POLYMERIZABLE COMPOSITION FOR OPTICAL MATERIAL AND POLYMERIZABLE COMPOSITION FOR OPTICAL MATERIAL

TECHNICAL FIELD

The present invention relates to a process for producing a polymerizable composition for an optical material and a polymerizable composition for an optical material.

BACKGROUND ART

In comparison with inorganic lenses, plastic lenses have a higher refractive index and a higher Abbe number, are lighter and harder to break, and can be dyed and have thus rapidly become widespread in optical materials such as spectacle lenses and camera lenses.

In particular, as to spectacle lenses, in view of use thereof, in addition to optical properties such as (1) a high refractive index and (2) a low dispersion (high Abbe number), there is a demand for many functions such as (3) excellent heat resistance, (4) excellent impact resistance, (5) easy dyeing, (6) excellent processability such as cutting, and various resin materials for lenses have been developed and used up to now.

Among these, a typical example is a polythiourethane-based resin, and polymerizable compositions including a predetermined monomer are disclosed (Patent Documents 1 to 4).

RELATED DOCUMENT

Patent Document

[Patent Document 1] Japanese Unexamined Patent Publication No. H2-270859
[Patent Document 2] Japanese Unexamined Patent Publication No. H3-124722
[Patent Document 3] Japanese Unexamined Patent Publication No. H7-252207
[Patent Document 4] International Publication No. 2007/020817 pamphlet

SUMMARY OF THE INVENTION

Technical Problem

However, the molded products including polythiourethane-based resins described in these patent documents have room for improvement in terms of impact resistance. In addition, even if a polymerizable composition having improved impact resistance is found, a stable impact resistance may not be realized in a case where a plurality of plastic spectacle lenses are industrially manufactured by industrially preparing a polymerizable composition in large quantities, as a result, there are problems such as the reduced yield of the products of plastic spectacle lenses.

Solution to Problem

As a result of extensive studies to solve the problems described above, the present inventors found that there is a relationship between the predetermined physical property values of a mixed solution of monomer components and a catalyst when preparing a polymerizable composition or of the polymerizable composition itself and the impact resistance of the resin molded product, thereby completing the present invention.

It is possible to represent the present invention as follows.

[1] A process for producing a polymerizable composition for an optical material, the method including a step of mixing (A) at least one kind of thiol compound having at least two mercapto groups, (B) a tin compound represented by general formula (1), and (C) at least one kind of isocyanate compound having at least two isocyanato groups, to obtain a polymerizable composition for an optical material having a haze value of 0.05 or less,

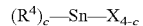

$$(R^4)_c\text{—Sn—}X_{4-c} \quad (1)$$

wherein, in general formula (1), $R^4$ represents an alkyl group having 1 to 8 carbon atoms, X represents a fluorine atom, a chlorine atom, a bromine atom, or —O—C(=O)—$R^5$, $R^5$ represents an alkyl group having 1 to 11 carbon atoms, and c represents an integer of 1 to 3.

[2] A process for producing a polymerizable composition for an optical material, the method including a step of mixing (A) at least one kind of thiol compound having at least two mercapto groups and (B) a tin compound represented by general formula (1); and a step of mixing (C) at least one kind of isocyanate compound having at least two isocyanato groups and a mixed solution obtained in the above step to obtain a polymerizable composition for an optical material, in which a haze value of the mixed solution including the component (A) and the component (B) is 0.05 or less,

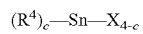

$$(R^4)_c\text{—Sn—}X_{4-c} \quad (1)$$

wherein, in general formula (1), $R^4$ represents an alkyl group having 1 to 8 carbon atoms, X represents a fluorine atom, a chlorine atom, a bromine atom, or —O—C(=O)—$R^5$, $R^5$ represents an alkyl group having 1 to 11 carbon atoms, and c represents an integer of 1 to 3.

[3] A process for producing a polymerizable composition for an optical material, the method including a step of mixing (B) a tin compound represented by general formula (1) and (C) at least one kind of isocyanate compound having at least two isocyanato groups; and a step of mixing a mixed solution obtained in the above step and (A) at least one kind of thiol compound having at least two mercapto groups to obtain a polymerizable composition for an optical material, in which a haze value of the mixed solution including the component (B) and the component (C) is 0.05 or less,

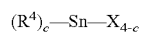

$$(R^4)_c\text{—Sn—}X_{4-c} \quad (1)$$

wherein, in general formula (1), $R^4$ represents an alkyl group having 1 to 8 carbon atoms, X represents a fluorine atom, a chlorine atom, a bromine atom, or —O—C(=O)—$R^5$, $R^5$ represents an alkyl group having 1 to 11 carbon atoms, and c represents an integer of 1 to 3.

[4] The process for producing a polymerizable composition for an optical material according to any one of [1] to [3], in which the isocyanate compound (C) includes at least one kind of compound selected from 2,4-tolylene diisocyanate, 2,6-tolylene diisocyanate, 4,4'-diphenylmethane diisocyanate, 1,3-phenylene diisocyanate, 1,4-phenylene diisocyanate, 1,6-hexamethylene diisocyanate, 1,5-pentamethylene diisocyanate, m-xylylene diisocyanate, isophorone diisocyanate, 1,3-bis(isocyanatomethyl)cyclohexane, 1,4-bis(isocyanatomethyl)cyclohexane, dicyclohexyl methane diisocyanate, 2,5-bis(isocyanatomethyl)bicyclo-[2.2.1]-heptane, and 2,6-bis(isocyanatomethyl)bicyclo-[2.2.1]-heptane.

[5] The process for producing a polymerizable composition for an optical material according to any one of [1] to [4], in which the thiol compound (A) includes at least one kind of compound selected from 4,6-bis(mercaptomethylthio)-1, 3-dithiane, 2-(2,2-bis(mercaptomethylthio)ethyl)-1,3-dithietane, pentaerythritol tetrakis (3-mercaptopropionate), pentaerythritol tetrakis (2-mercaptoacetate), trimethylolpropane tris(3-mercaptopropionate), trimethylolpropane tris(2-mercaptoacetate), 4-mercaptomethyl-1,8-dimercapto-3,6-dithiaoctane, 2,5-bismercaptomethyl-1,4-dithiane, 1,1,3,3-tetrakis (mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, ethylene glycol bis(3-mercaptopropionate), diethylene glycol bis(3-mercaptopropionate), ethylene glycol bis(2-mercaptoacetate), and diethylene glycol bis(2-mercaptoacetate).

[6] A polymerizable composition for an optical material including (A) at least one kind of thiol compound having at least two mercapto groups; (B) a tin compound represented by general formula (1)

$$(R^4)_c\!-\!Sn\!-\!X_{4-c} \quad (1)$$

wherein, in general formula (1), $R^4$ represents an alkyl group having 1 to 8 carbon atoms, X represents a fluorine atom, a chlorine atom, a bromine atom, or —O—C(=O)—$R^5$, $R^5$ represents an alkyl group having 1 to 11 carbon atoms, and c represents an integer of 1 to 3; and (C) at least one kind of isocyanate compound having at least two isocyanato groups, in which the polymerizable composition for an optical material has a haze value of 0.05 or less.

[7] A polymerizable composition for an optical material including (C) at least one kind of isocyanate compound having at least two isocyanato groups; and a mixed solution with a haze value of 0.05 or less, in which the mixed solution includes (A) at least one kind of thiol compound having at least two mercapto groups, and (B) a tin compound represented by general formula (1)

$$(R^4)_c\!-\!Sn\!-\!X_{4-c} \quad (1)$$

wherein, in general formula (1), $R^4$ represents an alkyl group having 1 to 8 carbon atoms, X represents a fluorine atom, a chlorine atom, a bromine atom or —O—C(=O)—$R^5$, $R^5$ represents an alkyl group having 1 to 11 carbon atoms, and c represents an integer of 1 to 3.

[8] A polymerizable composition for an optical material including (A) at least one kind of thiol compound having at least two mercapto groups; and a mixed solution with a haze value of 0.05 or less, in which the mixed solution includes (B) a tin compound represented by general formula (1)

$$(R^4)_c\!-\!Sn\!-\!X_{4-c} \quad (1)$$

wherein, in general formula (1), $R^4$ represents an alkyl group having 1 to 8 carbon atoms, X represents a fluorine atom, a chlorine atom, a bromine atom or —O—C(=O)—$R^5$, $R^5$ represents an alkyl group having 1 to 11 carbon atoms, and c represents an integer of 1 to 3, and (C) at least one kind of isocyanate compound having at least two isocyanato groups.

[9] The polymerizable composition for an optical material according to any one of [6] to [8], in which the isocyanate compound (C) includes at least one kind of compound selected from 2,4-tolylene diisocyanate, 2,6-tolylene diisocyanate, 4,4'-diphenylmethane diisocyanate, 1,3-phenylene diisocyanate, 1,4-phenylene diisocyanate, 1,6-hexamethylene diisocyanate, 1,5-pentamethylene diisocyanate, m-xylylene diisocyanate, isophorone diisocyanate, 1,3-bis(isocyanatomethyl)cyclohexane, 1,4-bis(isocyanatomethyl)cyclohexane, dicyclohexyl methane diisocyanate, 2,5-bis(isocyanatomethyl)bicyclo-[2.2.1]-heptane, and 2,6-bis(isocyanatomethyl)bicyclo-[2.2.1]-heptane.

[10] The polymerizable composition for an optical material according to [9], in which the isocyanate compound (C) includes at least one kind of compound selected from 1,6-hexamethylene diisocyanate, 2,5-bis(isocyanatomethyl) bicyclo-[2.2.1]-heptane, and 2,6-bis(isocyanatomethyl)bicyclo-[2.2.1]-heptane.

[11] The polymerizable composition for an optical material according to any one of [6] to [10], in which the thiol compound (A) includes at least one kind of compound selected from 4,6-bis(mercaptomethylthio)-1,3-dithiane, 2-(2,2-bis(mercaptomethylthio)ethyl)-1,3-dithietane, pentaerythritol tetrakis (3-mercaptopropionate), pentaerythritol tetrakis (2-mercaptoacetate), trimethylolpropane tris(3-mercaptopropionate), trimethylolpropane tris(2-mercaptoacetate), 4-mercaptomethyl-1,8-dimercapto-3,6-dithiaoctane, 2,5-bismercaptomethyl-1,4-dithiane, 1,1,3,3-tetrakis (mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, ethylene glycol bis(3-mercaptopropionate), diethylene glycol bis(3-mercaptopropionate), ethylene glycol bis(2-mercaptoacetate), and diethylene glycol bis(2-mercaptoacetate).

[12] The polymerizable composition for an optical material according to [11], in which the thiol compound (A) includes at least one kind of compound selected from 4-mercaptomethyl-1,8-dimercapto-3,6-dithiaoctane, and pentaerythritol tetrakis (3-mercaptopropionate).

[13] A method for manufacturing a plastic lens including a step of injecting the polymerizable composition for an optical material according to any one of [6] to [12] into a lens-casting mold; a step of polymerizing the polymerizable composition for an optical material; and a step of releasing the resin obtained in the above step from the lens-casting mold to obtain a molded product.

[14] A molded product obtained by curing the polymerizable composition for an optical material according to any one of [6] to [12].

[15] An optical material including the molded product according to [14].

[16] A lens including the optical material according to [15].

[17] A spectacle lens including the lens according to [16].

[18] A spectacle lens including the lens according to [16]; and a hard coating layer and/or an anti-reflection coating layer formed on at least one surface of the lens.

[19] A method for controlling a mixing state of a polymerizable composition for an optical material, the method including the step of the manufacturing method according to any one of [1] to [5].

Advantageous Effects of Invention

According to the process for producing a polymerizable composition for an optical material of the present invention, it is possible to provide a polymerizable composition for an optical material allowing a molded product excellent in impact resistance to be obtained by controlling the haze value of the mixed solution of the monomer component and the tin compound as the catalyst and the haze value of the polymerizable composition itself. In particular, it is possible to stably obtain a polymerizable composition which is a raw material of a molded product excellent in impact resistance in large-scale production and to provide a process for producing a polymerizable composition excellent in manufacturing stability.

In addition, since the polymerizable composition for an optical material of the present invention has a predetermined haze value, it is possible to stably obtain a molded product excellent in impact resistance, and the yield of products such as optical materials is improved.

DESCRIPTION OF EMBODIMENTS

A description will be given below regarding the process for producing a polymerizable composition for an optical material and the polymerizable composition for an optical material of the present invention using first to third embodiments. It is also possible to describe the process for producing a polymerizable composition for an optical material of the present invention as a method for controlling the mixing state of the polymerizable composition for an optical material.

First Embodiment

The process for producing a polymerizable composition for an optical material of the present embodiment includes a step of mixing (A) at least one kind of thiol compound having at least two mercapto groups (referred to below as thiol compound (A)), (B) a tin compound (referred to below as tin compound (B)) represented by general formula (1), and (C) at least one kind of isocyanate compound having at least two isocyanato groups (referred to below as isocyanate compound (C)). In this step, it is possible to set the haze value of the obtained polymerizable composition for an optical material to 0.05 or less.

Specific examples of the manufacturing method include a manufacturing method a including a step a1 and a step a2 or a manufacturing method b including a step b1 and a step b2 as described below.

Manufacturing Method a

Step a1: Mix a thiol compound (A) and a tin compound (B).

Step a2: Mix an isocyanate compound (C) with the mixed solution obtained in the step a1 to obtain a polymerizable composition for an optical material having a haze value of 0.05 or less.

Manufacturing Method b

Step b1: Mix an isocyanate compound (C) and a tin compound (B).

Step b2: Mix a thiol compound (A) with the mixed solution obtained in the step b1 to obtain a polymerizable composition for an optical material having a haze value of 0.05 or less.

First, a description will be given regarding the manufacturing method a.

(Manufacturing Method a)

The manufacturing method a includes the following steps.

Step a1: Mix a thiol compound (A) and a tin compound (B).

Step a2: Mix an isocyanate compound (C) with the mixed solution obtained in the step a1 to obtain a polymerizable composition for an optical material having a haze value of 0.05 or less.

Each step will be described below.

[Step a1]

First, a mixed solution of a thiol compound (A) and a tin compound (B) is obtained.

(Thiol Compound (A))

The thiol compound (A) is a compound having at least two mercapto groups in the molecule, and examples thereof include an aliphatic thiol compound, an aromatic thiol compound, and the like.

Examples of the aliphatic thiol compound include methanedithiol, 1,2-ethanedithiol, 1,2-propanedithiol, 1,3-propanedithiol, 1,4-butanedithiol, 1,5-pentanedithiol, 1,6-hexanedithiol, 1,2-cyclohexanedithiol, 3,4-dimethoxybutane-1,2-dithiol, 2-methylcyclohexane-2,3-dithiol, 1,2-dimercaptopropyl methyl ether, 2,3-dimercaptopropyl methyl ether, bis(2-mercaptoethyl)ether, tetrakis (mercaptomethyl)methane, bis(mercaptomethyl)sulfide, bis(mercaptomethyl)disulfide, bis(mercaptoethyl)sulfide, bis(mercaptoethyl)disulfide, bis(mercaptomethylthio)methane, bis(2-mercaptoethylthio) methane, 1,2-bis(mercaptomethylthio)ethane, 1,2-bis(2-mercaptoethylthio)ethane, 1,3-bis(mercaptomethylthio)propane, 1,3-bis(2-mercaptoethylthio)propane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis (mercaptomethylthio)propane, 4,6-bis(mercaptomethylthio)-1,3-dithiane, 2-(2,2-bis(mercaptomethylthio)ethyl)-1,3-dithietane, tetrakis (mercaptomethylthio methyl)methane, tetrakis (2-mercaptoethylthio methyl) methane, bis(2,3-dimercaptopropyl)sulfide, 2,5-bismercaptomethyl-1,4-dithiane, ethylene glycol bis(2-mercaptoacetate), ethylene glycol bis(3-mercaptopropionate), diethylene glycol bis(2-mercaptoacetate), diethylene glycol bis(3-mercaptopropionate), 2,3-dimercapto-1-propanol (3-mercaptopropionate), 3-mercapto-1,2-propanediol bis(2-mercaptoacetate), 3-mercapto-1,2-propanediol di(3-mercaptopropionate), trimethylolpropane tris(2-mercaptoacetate), ditrimethylolpropane tetrakis (2-mercaptoacetate), trimethylolpropane tris(3-mercaptopropionate), ditrimethylolpropane tetrakis (3-mercaptopropionate), trimethylol ethane tris(2-mercaptoacetate), trimethylol ethane tris(3-mercaptopropionate), pentaerythritol tetrakis (2-mercaptoacetate), dipentaerythritol hexa(2-mercaptoacetate), pentaerythritol di(3-mercaptopropionate), pentaerythritol tris(3-mercaptopropionate), pentaerythritol tetrakis (3-mercaptopropionate), dipentaerythritol hexa(3-mercaptopropionate), glycerin di(2-mercaptoacetate), glycerin tris(2-mercaptoacetate), glycerin di(3-mercaptopropionate), glycerin tris(3-mercaptopropionate), 1,4-cyclohexane diol bis(2-mercaptoacetate), 1,4-cyclohexane diol bis(3-mercaptopropionate), hydroxymethyl sulfide bis(2-mercaptoacetate), hydroxymethyl sulfide bis(3-mercaptopropionate), hydroxyethyl sulfide (2-mercaptoacetate), hydroxyethyl sulfide (3-mercaptopropionate), hydroxymethyl disulfide (2-mercaptoacetate), hydroxymethyl disulfide (3-mercaptopropionate), thioglycolic acid bis(2-mercapto ethyl ester), thiodipropionic acid bis(2-mercapto ethyl ester), N,N',N"-tris(3-mercaptopropylcarbonyloxyethyl)isocyanurate.

Examples of the aromatic thiol compound include 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,3,5-tris(mercaptoethyl)benzene, 1,2,4-tris(mercaptoethyl)benzene, 2,5-toluenedithiol, 3,4-toluenedithiol, 1,4-naphthalene dithiol, 1,5-naphthalene dithiol, 2,6-naphthalene dithiol, 2,7-naphthalene dithiol, 1,2,3,4-tetramercaptobenzene, 1,2,3,5-tetramercaptobenzene, 1,2,4,5-tetramercaptobenzene, 1,2,3,4-tetrakis (mercaptomethyl) benzene, 1,2,3,5-tetrakis (mercaptomethyl)benzene, 1,2,4,5-tetrakis (mercaptomethyl)benzene, 1,2,3,4-tetrakis (mercaptoethyl)benzene, 1,2,3,5-tetrakis (mercaptoethyl) benzene, 1,2,4,5-tetrakis (mercaptoethyl)benzene, 2,2'-dimercaptobiphenyl, 4,4'-dimercaptobiphenyl, and the like.

Among these exemplified compounds, aliphatic thiol compounds are preferable, and among these, at least one kind of compound selected from 4,6-bis(mercaptomethylthio)-1,3-dithiane, 2-(2,2-bis(mercaptomethylthio)ethyl)-1,3-dithietane, pentaerythritol tetrakis (3-mercaptopropionate), pentaerythritol tetrakis (2-mercaptoacetate), trimethylol propane tris(3-mercaptopropionate), trimethylol propane tris(2-mercaptoacetate), 4-mercaptomethyl-1,8-dimercapto-3,6-dithiaoctane, 2,5-bismercaptomethyl-1,4-dithiane, 1,1,3,3-tetrakis (mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, ethylene glycol bis(3-mercaptopropionate), diethylene glycol bis(3-mercaptopropionate), ethylene glycol bis(2-mercaptoacetate), and diethylene glycol bis(2-mercaptoacetate), is more preferable, at least one kind of compound selected from pentaerythritol tetrakis (3-mercaptopropionate), 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 2,5-bismercaptomethyl-1,4-dithiane, 1,1,3,3-tetrakis (mercaptomethylthio)propane, 4,6-bis(mercaptomethylthio)-1,3-dithiane, and 2-(2,2-bis(mercaptomethylthio)ethyl)-1,3-dithietane is even more preferable, and at least one kind of compound selected from pentaerythritol tetrakis (3-mercaptopropionate), and 4-mercaptomethyl-1,8-dimercapto-3,6-dithiaoctane is particularly preferable.

(Tin Compound (B))

It is possible to represent the tin compound (B) by general formula (1) below.

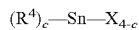

$$(R^4)_c\text{—Sn—}X_{4-c} \quad (1)$$

In general formula (1), $R^4$ represents an alkyl group having 1 to 8 carbon atoms, preferably an alkyl group having 1 to 4 carbon atoms. X represents a fluorine atom, a chlorine atom, a bromine atom, or —O—C(=O)—$R^5$, preferably a chlorine atom. $R^5$ represents an alkyl group having 1 to 11 carbon atoms, and c represents an integer of 1 to 3.

Examples of the tin compound (B) include dialkyl tin halides such as dimethyl tin dichloride, dibutyl tin dichloride and dioctyl tin dichloride, and dialkyl tin dicarboxylates such as dimethyl tin diacetate, dibutyl tin diacetate, dibutyl tin dioctanoate, dibutyl tin dilaurate, and dioctyl tin dilaurate.

Among these, examples of solids at room temperature include dimethyl tin dichloride, dibutyl tin dichloride, dioctyl tin dichloride, dimethyl tin diacetate, dibutyl tin diacetate, and dibutyl tin dioctanoate, and examples of liquids at room temperature include dibutyl tin dilaurate and the like. In the present embodiment, in a case where a tin compound (B) which is liquid at room temperature is used, the impact resistance of the obtained resin molded product tends to be further improved.

The dialkyl tin halides may include monoalkyl tin halides and trialkyl tin halides. The dialkyl tin dicarboxylates may include monoalkyl tin tricarboxylates, trialkyl tin carboxylates.

Among these, dialkyl tin halides are preferable, dialkyl tin halides having an alkyl group having 1 to 8 carbon atoms are more preferable, and dialkyl tin halides having an alkyl group having 1 to 4 carbon atoms are particularly preferable. Specifically, these include dibutyl tin dichloride and dimethyl tin dichloride.

The tin compound (B) may be used in an amount of 0.018 to 1.080 parts by weight with respect to 100 parts by weight of the thiol compound (A), preferably 0.035 to 0.750 parts by weight, and more preferably 0.050 to 0.400 parts by weight.

The mixing conditions of the tin compound (B) and the thiol compound (A) are not particularly limited; however, the mixing may be performed in dry air or in an inert gas atmosphere at room temperature (25° C.).

[Step a2]

Next, an isocyanate compound (C) and the mixed solution obtained in the step a1 are mixed to obtain a polymerizable composition for an optical material having a haze value of 0.05 or less.

(Isocyanate Compound (C))

The isocyanate compound (C) is a compound having at least two isocyanato groups in the molecule, and examples thereof include alicyclic isocyanate, aliphatic isocyanate, aromatic isocyanate, heterocyclic isocyanate, and the like. The isocyanate compound (C) may include dimers, trimers, biuret bodies, and prepolymers of the above.

Examples of the alicyclic isocyanate include isophorone diisocyanate, 1,3-bis(isocyanatomethyl)cyclohexane, 1,4-bis(isocyanatomethyl)cyclohexane, dicyclohexyl methane diisocyanate, cyclohexanediisocyanate, methyl cyclohexanediisocyanate, dicyclohexyl dimethyl methane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, and the like, and at least one kind thereof may be used.

Examples of the aliphatic isocyanate include 1,6-hexamethylene diisocyanate, 2,2,4-trimethylhexamethylene diisocyanate, 2,4,4-trimethylhexamethylene diisocyanate, 1,5-pentamethylene diisocyanate, lysine diisocyanatomethyl ester, lysine triisocyanate, m-xylylene diisocyanate, α,α,α',α'-tetramethylxylylene diisocyanate, bis(isocyanatomethyl) naphthalene, 1,3,5-tris(isocyanatomethyl)benzene, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio) methane, bis(isocyanatoethylthio)ethane, bis(isocyanatomethylthio)ethane, and the like.

Examples of the aromatic isocyanates include tolylene diisocyanate, 4,4'-diphenylmethane diisocyanate, 1,3-phenylene diisocyanate, 1,4-phenylene diisocyanate, and the like, and the tolylene diisocyanate is at least one kind of isocyanate selected from 2,4-tolylene diisocyanate, and 2,6-tolylene diisocyanate. Examples of the tolylene diisocyanates include 2,4-tolylene diisocyanate, 2,6-tolylene diisocyanate, a mixture of 2,4-tolylene diisocyanate and 2,6-tolylene diisocyanate, or the like.

Examples of the heterocyclic isocyanate include 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl) tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and the like.

Examples of the isocyanate compound (C) preferably include at least one kind of compound selected from 2,4-tolylene diisocyanate, 2,6-tolylene diisocyanate, 4,4'-diphenylmethane diisocyanate, 1,3-phenylene diisocyanate, 1,4-phenylene diisocyanate, 1,6-hexamethylene diisocyanate, 1,5-pentamethylene diisocyanate, m-xylylene diisocyanate, isophorone diisocyanate, 1,3-bis(isocyanatomethyl)cyclohexane, 1,4-bis(isocyanatomethyl)cyclohexane, dicyclohexylmethane diisocyanate, 2,5-bis(isocyanatomethyl)bicyclo-[2.2.1]-heptane, and 2,6-bis(isocyanatomethyl)bicyclo-[2.2.1]-heptane, and more preferably include at least one kind of compound selected from 1,6-hexamethylene diisocyanate, 2,5-bis(isocyanatomethyl)bicyclo-[2.2.1]-heptane, and 2,6-bis(isocyanatomethyl)bicyclo-[2.2.1]heptane.

In the present embodiment, as the isocyanate compound (C), it is preferable to use at least one kind of isocyanate compound having a cyclic structure selected from 2,5-bis(isocyanatomethyl)bicyclo-[2.2.1]-heptane, 2,6-bis(isocyanatomethyl)bicyclo-[2.2.1]-heptane, 1,3-bis(isocyanatomethyl)cyclohexane, 1,4-bis(isocyanatomethyl)cyclohexane, and m-xylylene diisocyanate, in combination with an aliphatic isocyanate compound having 4 to 11 carbon atoms with no cyclic structure.

Furthermore, in the present embodiment, as the isocyanate compound (C), it is more preferable to use at least one kind of isocyanate compound having a cyclic structure selected from 2,5-bis(isocyanatomethyl)bicyclo-[2.2.1]-heptane and 2,6-bis(isocyanatomethyl)bicyclo-[2.2.1]-heptane, in combination with an aliphatic isocyanate compound having 4 to 11 carbon atoms with no cyclic structure.

In the polymerizable composition for an optical material of the present embodiment, as the isocyanate compound (C), it is preferable to include a combination of at least one kind of compound selected from 2,5-bis(isocyanatomethyl)bicyclo-[2.2.1]-heptane, 2,6-bis(isocyanato methyl)bicyclo-[2.2.1]-heptane, 1,3-bis(isocyanatomethyl)cyclohexane, 1,4-bis(isocyanatomethyl)cyclohexane, and m-xylylene diisocyanate, with 1,6-hexamethylene diisocyanate, and, as the thiol compound (A), it is preferable to include at least one kind of compound selected from 4-mercaptomethyl-1,8-dimercapto-3,6-dithiaoctane and pentaerythritol tetrakis (3-mercaptopropionate).

Furthermore, in the polymerizable composition for an optical material according to the present embodiment, as the isocyanate compound (C), it is more preferable to include a combination of at least one kind of compound selected from 2,5-bis(isocyanatomethyl)bicyclo-[2.2.1]-heptane and 2,6-bis(isocyanato methyl)bicyclo-[2.2.1]-heptane, with 1,6-hexamethylene diisocyanate, and, as the thiol compound (A), it is more preferable to include at least one kind of compound selected from 4-mercaptomethyl-1,8-dimercapto-3,6-dithiaoctane and pentaerythritol tetrakis (3-mercaptopropionate).

In the present embodiment, the thiol compound (A) and the isocyanate compound (C) are preferably the following combinations (1) to (4), more preferably combination (1) and combination (2), and particularly preferably combination (1).

Combination (1)
  Thiol compound (A): 4-mercaptomethyl-1,8-dimercapto-3,6-dithiaoctane, and pentaerythritol tetrakis (3-mercaptopropionate)
  Isocyanate compound (C): a mixture of 2,5-bis(isocyanatomethyl)-bicyclo[2.2.1]heptane and 2,6-bis(isocyanatomethyl)-bicyclo[2.2.1]heptane, and hexamethylene diisocyanate Combination (2)
  Thiol compound (A): 4-mercaptomethyl-1,8-dimercapto-3,6-dithiaoctane and pentaerythritol tetrakis (3-mercaptopropionate)
  Isocyanate compound (C): a mixture of 2,5-bis(isocyanatomethyl)-bicyclo[2.2.1]heptane and 2,6-bis(isocyanatomethyl)-bicyclo[2.2.1]heptane Combination (3)
  Thiol compound (A): a mixture of 5,7 (or 4,7 or 4,8)-dimercaptomethyl-1,11-mercapto-3,6,9-trithiaundecane
  Isocyanate compound (C): a mixture of 2,5-bis(isocyanatomethyl)-bicyclo[2.2.1]heptane and 2,6-bis(isocyanatomethyl)-bicyclo[2.2.1]heptane Combination (4)
  Thiol compound (A): pentaerythritol tetrakis (3-mercaptopropionate)
  Isocyanate compound (C): a mixture of 2,5-bis(isocyanatomethyl)-bicyclo[2.2.1]heptane and 2,6-bis(isocyanatomethyl)-bicyclo[2.2.1]heptane, and hexamethylene diisocyanate In addition, in the step a2, a thiol compound (D) which is the same as or different from the thiol compound (A) used in the step a1 may be separately added. The isocyanate compound (C) may be mixed after mixing the mixed solution obtained in the step a1 and the thiol compound (D), and the mixed solution of the isocyanate compound (C) and the thiol compound (D) may be added to the mixed solution obtained in the step a1, or the thiol compound (D) may be added after mixing the mixed solution obtained in the step a1 and the isocyanate compound (C).

The thiol compound (D) is a compound having at least two mercapto groups in the molecule in the same manner as the thiol compound (A) and examples thereof include an aliphatic thiol compound, an aromatic thiol compound, and the like. Specific compounds are as listed in the explanation of the step a1.

The thiol compound (D) preferably includes an aliphatic polythiol compound having at least one or more ester bonds in the molecule. Preferable examples of the aliphatic polythiol compound having an ester bond in the molecule include pentaerythritol tetrakis (3-mercaptopropionate), pentaerythritol tris(3-mercaptopropionate), pentaerythritol di(3-mercaptopropionate), dipentaerythritol hexa(3-mercaptopropionate), dipentaerythritol penta(3-mercaptopropionate), dipentaerythritol tetrakis (3-mercaptopropionate), pentaerythritol tetrakis (2-mercaptoacetate), trimethylol propane tris(3-mercaptopropionate), trimethylol propane tris(2-mercaptoacetate), ethylene glycol bis(3-mercaptopropionate), diethylene glycol bis(3-mercaptopropionate), ethylene glycol bis(2-mercaptoacetate), and diethylene glycol bis(2-mercaptoacetate), and more preferable examples include pentaerythritol tetrakis (3-mercaptopropionate) and pentaerythritol tris(3-mercaptopropionate).

In the present embodiment, the molar ratio of the total amount of the mercapto groups in the thiol compound (A) and the thiol compound (D) with respect to the total amount of isocyanato groups in the isocyanate compound (C) is in the range of 0.8 to 1.2, preferably in the range of 0.85 to 1.15, and more preferably in the range of 0.9 to 1.1. Within the above ranges, it is possible to obtain a molded product suitably used as an optical material, in particular, as a plastic lens material for spectacles.

In addition, in the polymerizable composition for an optical material of the present embodiment, a modifier may be added within a range not impairing the effects of the present invention for the purpose of adjusting various physical properties such as the optical properties, impact resistance, specific gravity, and the like of the obtained molded product and adjusting the handling properties of each component of the polymerizable composition.

Examples of modifiers include olefin compounds including episulfide compounds, alcohol compounds, amine compounds, epoxy compounds, organic acids and anhydrides thereof, (meth)acrylate compounds, and the like. Cases where no hydroxyl group is included are preferable from the viewpoint of the occurrence of unevenness and the dyeability at the time of lens polymerization.

In the present embodiment, depending on the purpose, in the same manner as known molding methods, various additives such as an internal release agent, a chain extender, a cross-linking agent, a light stabilizer, an ultraviolet absorbing agent, an antioxidant, a coloring inhibitor, an oil-soluble dye, a filler, and an adhesion improver, may be added to the polymerizable composition for an optical material.

As the internal release agent, an acidic phosphate ester may be used. Examples of acidic phosphate esters include phosphoric monoesters and phosphoric diesters and these may be used alone or in a mixture of at least two kinds.

The polymerizable composition for an optical material of the present embodiment includes the compound (A), the compound (B), and the compound (C), and, as necessary, the compound (D) and other additives.

In the step a2, in a case of preparing the polymerizable composition by mixing the mixed solution obtained in the step a1, the isocyanate compound (C), the thiol compound (D) as necessary, and other additives, the preparation is usually performed at the temperature of 25° C. or less. From the viewpoint of the pot life of the polymerizable composition, it may be preferable to further lower the temperature. However, in a case where the solubility of the internal release agent and additives in a polymerizable composition or the like is not good, dissolution in a polymerizable composition, a modifier, or the like in advance by heating is also possible.

The haze value of the obtained polymerizable composition for an optical material is measured in accordance with JIS K 7136 (ISO 14782), and may be 0.05 or less, preferably 0.03 or less, more preferably 0.025 or less, even more preferably 0.015 or less, and particularly preferably 0.01 or less.

Controlling the haze value of the polymerizable composition for an optical material as an index makes it possible to stably obtain a molded product excellent in impact resistance and improves the yield of products such as optical materials. In particular, it is possible to stably obtain a polymerizable composition which is a raw material of a molded product excellent in impact resistance in large-scale production and to provide a process for producing a polymerizable composition excellent in manufacturing stability. Furthermore, using the polymerizable composition for an optical material of the present embodiment makes it possible to obtain a molded product having excellent impact resistance, and to improve the yield of products such as optical materials.

Here, in a case where the haze value of the polymerizable composition exceeds the above range, adjustments may be made such that the haze value falls within the above range by an operation such as adjusting the mixing time or stirring speed. Although the causative agent which affects the haze value is not clear, it is assumed to be the presence of trace amounts of impurities derived from the thiol compound (A) and/or the tin compound (B). It is considered that, through the above operations, it is possible to reduce the amount of impurities of the polymerizable composition, and as a result, the haze value is lowered.

Here, the haze value of the polymerizable composition for an optical material of the present embodiment is difficult to reduce by filtration, and is within the above range before a filtration step. Examples of a filtration step may include a step of filtering with a 1 μm PTFE filter In a case where the haze value of the polymerizable composition is a predetermined value or less, use thereof is possible as the polymerizable composition for an optical material of the present embodiment.

(Manufacturing Method b)

The manufacturing method b includes the following steps.

Step b1: Mix an isocyanate compound (C) and a tin compound (B).

Step b2: Mix a thiol compound (A) with the mixed solution obtained in the step b1 to obtain a polymerizable composition for an optical material having a haze value of 0.05 or less.

Each step will be described below.

[Step b1]

As the isocyanate compound (C) and the tin compound (B), the same compounds as in the manufacturing method a may be used. The tin compound (B) may be used in an amount of 0.010 to 0.620 parts by weight with respect to 100 parts by weight of the isocyanate compound (C), preferably 0.020 to 0.430 parts by weight, and more preferably 0.030 to 0.230 parts by weight.

The mixing conditions of the isocyanate compound (C) and the tin compound (B) are not particularly limited; however, the mixing may be performed in dry air or in an inert gas atmosphere at room temperature (25° C.).

[Step b2]

In this step, the thiol compound (A) and the mixed solution obtained in the step b1 are mixed to obtain a polymerizable composition for an optical material having a haze value of 0.05 or less.

For the thiol compound (A), the same compound as the manufacturing method a may be used, and the thiol compound (D) may be included and used as the thiol compound (A). Furthermore, the other components described in the step a2 may be added to the polymerizable composition for an optical material of the present embodiment.

In the polymerizable composition for an optical material of the present embodiment, as the isocyanate compound (C), it is preferable to include a combination of at least one kind of compound selected from 2,5-bis(isocyanatomethyl)bicyclo-[2.2.1]-heptane, 2,6-bis(isocyanatomethyl)bicyclo-[2.2.1]-heptane, 1,3-bis(isocyanatomethyl)cyclohexane, 1,4-bis(isocyanatomethyl)cyclohexane, and m-xylylene diisocyanate with hexamethylene diisocyanate, and, as the thiol compound (A), it is preferable to include pentaerythritol tetrakis (3-mercaptopropionate) and 4-mercaptomethyl-1,8-dimercapto-3,6-dithiaoctane.

The mixing conditions of the thiol compound (A) and the mixed solution obtained in the step b1 are not particularly limited; however, the mixing may be performed in dry air or in an inert gas atmosphere at room temperature (25° C.).

The haze value of the obtained polymerizable composition for an optical material is measured in accordance with JIS K 7136 (ISO 14782), and may be 0.05 or less, preferably 0.03 or less, more preferably 0.025 or less, even more preferably 0.015 or less, and particularly preferably 0.01 or less.

Controlling the haze value of the polymerizable composition for an optical material as an index makes it possible to stably obtain a molded product excellent in impact resistance and improves the yield of products such as optical materials. In particular, it is possible to stably obtain a polymerizable composition which is a raw material of a molded product excellent in impact resistance in large-scale production and to provide a process for producing a polymerizable composition excellent in manufacturing stability. Furthermore, using the polymerizable composition for an optical material of the present embodiment makes it possible to obtain a molded product having excellent impact resistance and to improve the yield of products such as optical materials.

Here, in a case where the haze value of the polymerizable composition exceeds the above range, adjustments may be made such that the haze value falls within the above range by an operation such as adjusting the mixing time or stirring speed. Although the causative agent which affects the haze value is not clear, it is assumed to be the presence of trace amounts of impurities derived from the thiol compound (A) and/or the tin compound (B). It is considered that, through the above operations, it is possible to reduce the amount of impurities of the polymerizable composition, and as a result, the haze value is lowered.

Here, the haze value of the polymerizable composition for an optical material of the present embodiment is difficult to reduce by filtration, and is within the above range before a filtration step. Examples of a filtration step include a step of filtering with a 1 μm PTFE filter.

In a case where the haze value of the polymerizable composition is a predetermined value or less, use thereof is possible as the polymerizable composition for an optical material of the present embodiment.

In the present embodiment, the molar ratio of the total amount of the mercapto groups in the thiol compound (A) with respect to the total amount of isocyanato groups in the isocyanate compound (C) is in the range of 0.8 to 1.2, preferably in the range of 0.85 to 1.15, and more preferably in the range of 0.9 to 1.1. Within the above ranges, it is possible to obtain a molded product suitably used as an optical material, in particular, as a plastic lens material for spectacles.

Second Embodiment

The process for producing the polymerizable composition for an optical material of the present embodiment includes the following steps.

Step c1: Mix a thiol compound (A) and a tin compound (B) to obtain a mixed solution having a haze value of 0.05 or less.

Step c2: Mix an isocyanate compound (C) and the mixed solution obtained in the step c1 to obtain a polymerizable composition for an optical material.

Each step will be described below.

[Step c1]

First, a mixed solution of a thiol compound (A) and a tin compound (B) is obtained. The step c1 may be carried out in the same manner as the step a1 of the manufacturing method a in the first embodiment.

Here, as the thiol compound (A) and the tin compound (B), the same compounds as in the manufacturing method a of the first embodiment may be used.

The tin compound (B) may be used in an amount of 0.018 to 1.080 parts by weight with respect to 100 parts by weight of the thiol compound (A), preferably 0.035 to 0.750 parts by weight, and more preferably 0.050 to 0.400 parts by weight.

The mixing conditions of the tin compound (B) and the thiol compound (A) are not particularly limited; however, the mixing may be performed in dry air or in an inert gas atmosphere at room temperature (25° C.).

The haze value of the obtained mixed solution is measured in accordance with JIS K 7136 (ISO 14782), and may be 0.05 or less, preferably 0.03 or less, more preferably 0.025 or less, even more preferably 0.015 or less, and particularly preferably 0.01 or less. The mixed solution with the haze value in the above ranges may be used in the step c2. Here, the haze value of the isocyanate compound (C) or of the solution in which other components are dissolved in the isocyanate compound (C), which are added to the mixed solution in the step c2 is almost 0 and does not have a big influence on the haze value of the polymerizable composition for an optical material, thus it is important to control the haze value of the mixed solution.

Controlling the haze value of the mixed solution as an index makes it possible to stably obtain a molded product excellent in impact resistance and improves the yield of products such as optical materials. In particular, it is possible to stably obtain a polymerizable composition which is a raw material of a molded product excellent in impact resistance in large-scale production and to provide a process for producing a polymerizable composition excellent in manufacturing stability.

Here, in a case where the haze value of the mixed solution exceeds the above range, adjustments may be made such that the haze value falls within the above range by an operation such as adjusting the mixing time or stirring speed. Although the causative agent which affects the haze value is not clear, it is assumed to be the presence of trace amounts of impurities derived from the thiol compound (A) and/or the tin compound (B). It is considered that, through the above operations, it is possible to reduce the amount of impurities of the mixed solution, and as a result, the haze value is lowered.

Here, in the present embodiment, the haze value of the mixed solution is difficult to reduce to within the above range by filtration. Examples of filtration include filtration using a 1 μm PTFE filter, and the like.

In a case where the haze value of the mixed solution is a predetermined value or less, the mixed solution may be used in the step c2.

[Step c2]

The mixed solution obtained in the step c1 and the isocyanate compound (C) are mixed to prepare a polymerizable composition for an optical material. The step c2 may be carried out in the same manner as the step a2 of the manufacturing method a in the first embodiment. Examples of the isocyanate compound (C) include the same compounds as in the manufacturing method a of the first embodiment. Furthermore, the thiol compound (D) may be used and examples thereof include the same compounds as in the manufacturing method a of the first embodiment.

The mixing conditions of the mixed solution obtained in the step c1 and the isocyanate compound (C) are not particularly limited; however, the mixing may be performed in dry air or in an inert gas atmosphere at room temperature (25° C.).

Here, the haze value of the isocyanate compound (C) or of the solution in which other components are dissolved in the isocyanate compound (C) is almost 0 and does not have a big influence on the haze value of the polymerizable composition for an optical material; however, in a case where the haze value of the obtained polymerizable composition for an optical material exceeds the above range as a result of this step, adjustments may be carried out such that the haze value is within the above ranges by further mixing and carrying out operations such as adjusting the mixing time and the stirring speed.

That is, the haze value of the polymerizable composition for an optical material in the present embodiment is measured in accordance with JIS K 7136 (ISO 14782), and may be 0.05 or less, preferably 0.03 or less, more preferably 0.025 or less, even more preferably 0.015 or less, and particularly preferably 0.01 or less.

In the present embodiment, the molar ratio of the total amount of the mercapto groups in the thiol compound (A) and the thiol compound (D) with respect to the total amount of isocyanato groups in the isocyanate compound (C) is in the range of 0.8 to 1.2, preferably in the range of 0.85 to 1.15, and more preferably in the range of 0.9 to 1.1. Within the above ranges, it is possible to obtain a molded product suitably used as an optical material, in particular, as a plastic lens material for spectacles.

In the polymerizable composition for an optical material of the present embodiment, as the isocyanate compound (C), it is preferable to include a combination of at least one kind of compound selected from 2,5-bis(isocyanatomethyl)bicyclo-[2.2.1]-heptane, 2,6-bis(isocyanatomethyl)bicyclo-[2.2.1]-heptane, 1,3-bis(isocyanatomethyl)cyclohexane, 1,4-bis(isocyanatomethyl)cyclohexane, and m-xylylene diisocyanate with hexamethylene diisocyanate, and, as the thiol compound (A), it is preferable to include 4-mercaptomethyl-1,8-dimercapto-3,6-dithiaoctane, and in a case of further adding a thiol compound (D), It is preferable to use pentaerythritol tetrakis (3-mercaptopropionate).

Third Embodiment

The process for producing the polymerizable composition for an optical material of the present embodiment includes the following steps.

Step d1: Mix an isocyanate compound (C) and a tin compound (B) to obtain a mixed solution having a haze value of 0.05 or less.

Step d2: Mix a thiol compound (A) and the mixed solution obtained in the step d1 to obtain a polymerizable composition for an optical material.

Each step will be described below.

[Step d1]

First, a mixed solution of an isocyanate compound (C) and a tin compound (B) is obtained. The step d1 may be performed in the same manner as the step b1 of the manufacturing method b in the first embodiment. Examples of the isocyanate compound (C) and the tin compound (B) include the same compounds as in the manufacturing method a of the first embodiment.

The tin compound (B) is used in an amount of 0.010 to 0.620 parts by weight with respect to 100 parts by weight of the isocyanate compound (C), preferably 0.020 to 0.430 parts by weight, and more preferably 0.030 to 0.230 parts by weight.

The mixing conditions of the isocyanate compound (C) and the tin compound (B) are not particularly limited; however, the mixing may be performed in dry air or in an inert gas atmosphere at room temperature (25° C.).

The haze value of the obtained mixed solution is measured in accordance with JIS K 7136 (ISO 14782), and may be 0.05 or less, preferably 0.03 or less, more preferably 0.025 or less, even more preferably 0.015 or less, and particularly preferably 0.01 or less. The mixed solution with the haze value in the above ranges may be used in the step d2. Here, the haze value of the thiol compound (A) or of the solution in which other components are dissolved in the thiol compound (A), which are added to the mixed solution in the step d2 is almost 0 and does not have a big influence on the haze value of the polymerizable composition for an optical material, thus it is important to control the haze value of the mixed solution.

Controlling the haze value of the mixed solution as an index makes it possible to stably obtain a molded product excellent in impact resistance and improves the yield of products such as optical materials. In particular, it is possible to stably obtain a polymerizable composition which is a raw material of a molded product excellent in impact resistance in large-scale production and to provide a process for producing a polymerizable composition excellent in manufacturing stability.

Here, in a case where the haze value of the mixed solution exceeds the above range, adjustments may be made such that the haze value falls within the above range by an operation such as adjusting the mixing time or stirring speed. Although the causative agent which affects the haze value is not clear, it is assumed to be the presence of trace amounts of impurities. It is considered that, through the above operations, it is possible to reduce the amount of impurities of the mixed solution, and as a result, the haze value is lowered. Here, in the present embodiment, the haze value of the mixed solution is difficult to reduce to within the above range by filtration. Examples of filtration include filtration using a 1 μm PTFE filter, and the like.

In a case where the haze value of the mixed solution is a predetermined value or less, the mixed solution in the step d2 may be used.

[Step d2]

In this step, the thiol compound (A) and the mixed solution obtained in the step d1 are mixed to obtain a polymerizable composition for an optical material having a haze value of 0.05 or less.

As the thiol compound (A), the same compounds as in the manufacturing method a in the first embodiment may be used, and the thiol compound (D) may be included and used as the thiol compound (A). Furthermore, in the polymerizable composition for an optical material of the present embodiment, the other components described in the step a2 of the manufacturing method a in the first embodiment may be added.

The mixing conditions of the thiol compound (A) and the mixed solution obtained in the step d1 are not particularly limited; however, the mixing may be performed in dry air or in an inert gas atmosphere at room temperature (25° C.).

Here, the haze value of the thiol compound (A) or of the solution in which other components are dissolved in the thiol compound (A) is almost 0 and does not have a big influence on the haze value of the polymerizable composition for an optical material; however, in a case where the haze value of the obtained polymerizable composition for an optical material exceeds the above range as a result of this step, adjustments may be carried out such that the haze value is within the above ranges by further mixing and carrying out operations such as adjusting the mixing time and the stirring speed.

That is, the haze value of the obtained polymerizable composition for an optical material in the present embodiment is measured in accordance with JIS K 7136 (ISO 14782), and may be 0.05 or less, preferably 0.03 or less, more preferably 0.025 or less, even more preferably 0.015 or less, and particularly preferably 0.01 or less.

In the present embodiment, the molar ratio of the total amount of the mercapto groups in the thiol compound (A) with respect to the total amount of isocyanato groups in the isocyanate compound (C) is in the range of 0.8 to 1.2, preferably in the range of 0.85 to 1.15, and more preferably in the range of 0.9 to 1.1. Within the above ranges, it is possible to obtain a molded product suitably used as an optical material, in particular, as a plastic lens material for spectacles.

In the polymerizable composition for an optical material of the present embodiment, as the isocyanate compound (C), it is preferable to include a combination of at least one kind of compound selected from 2,5-bis(isocyanatomethyl)bicyclo-[2.2.1]-heptane, 2,6-bis(isocyanatomethyl)bicyclo-[2.2.1]-heptane, 1,3-bis(isocyanatomethyl)cyclohexane, 1,4-bis(isocyanatomethyl)cyclohexane, and m-xylylene diisocyanate with hexamethylene diisocyanate, and, as the thiol compound (A), it is preferable to include pentaerythritol tetrakis (3-mercaptopropionate) and 4-mercaptomethyl-1,8-dimercapto-3,6-dithiaoctane.

<Molded Product and Application>

In the present embodiment, the method for manufacturing a molded product comprised of a polythiourethane resin is not particularly limited, but examples of preferable manufacturing methods include casting polymerization. As an example of casting polymerization, the polymerizable composition is poured into a casting mold in which two molding molds are held with a gasket or a tape or the like. At this time, depending on the physical properties required for the plastic lens to be obtained, it is preferable to perform a degassing treatment under reduced pressure or a filtration treatment such as pressurization and depressurization, or the like as necessary in many cases.

Regarding the polymerization conditions, since the conditions are largely different depending on the polymerizable composition, the kind and amount of the catalyst used, the shape of the mold, and the like, the conditions are not limited and the polymerization is performed for approximately 1 to 50 hours at a temperature of −50° C. to 150° C. It is preferable to carry out the curing by holding the temperature within a range of 5° C. to 150° C. or by gradually raising the temperature, but it is possible to set the temperature as appropriate.

Then, the resin obtained by polymerization curing is released from the casting mold to obtain a molded product.

The molded product of the present embodiment may be subjected to a treatment such as annealing as necessary. The treatment temperature is usually 50° C. to 150° C., preferably 90° C. to 140° C., and more preferably 100° C. to 130° C.

It is possible to obtain the polymerizable composition for an optical material of the present embodiment as a molded product of various shapes by changing the mold for the casting polymerization. It is possible to use the molded product of the present embodiment for various optical materials by forming the molded product into a desired shape and providing the molded product with a coating layer, other member, or the like formed as necessary.

The molded product of the present embodiment is provided with a high refractive index and high transparency and can be used in such optical materials as an optical molded product such as a spectacle lens, a camera lens, a light emitting diode (LED), a prism, an optical fiber, an information-recording substrate, a filter, or a light emitting diode. In particular, the molded product of the present embodiment is suitable as an optical material for lenses such as spectacle lenses and camera lenses, light emitting diodes, and the like.

The molded product of the present embodiment may be used by applying a coating layer on one surface or both surfaces thereof, as necessary. Examples of the coating layer include a hard coating layer, an anti-reflection film layer, an anti-fog coating film layer, an anti-fouling layer, a water-repellent layer, a primer layer, a photochromic layer, and the like. These coating layers may each be used alone, or a plurality of coating layers may be used in multiple layers. In a case of applying coating layers on both surfaces, the same coating layer may be applied to each surface or different coating layers may be applied to each surface.

The spectacle lens of the present embodiment may be provided with a hard coating layer and/or an anti-reflection coating layer formed on at least one surface of a molded product (lens) obtained by curing the polymerizable composition for an optical material of the present embodiment. Furthermore, another layer described above may be provided. In addition, in a spectacle lens obtained from a specific thiol compound (A) and isocyanate compound (C), even there is no primer layer between the base material layer and the hard coating layer or the anti-reflection coating layer, the impact resistance may be excellent. That is, the hard coating layer and/or the anti-reflection coating layer may be formed directly on one surface of the base material layer. Since there is no need to provide a primer layer, the productivity of the spectacle lens is improved.

The hard coating layer is provided on at least one surface of a molded product (lens) obtained by curing the polymerizable composition for an optical material of the present embodiment, and is a coating layer with the object of imparting functions such as scratch resistance, abrasion resistance, moisture resistance, hot water resistance, heat resistance, and light resistance to the lens surface. The hard coating layer is obtained from a composition which contains at least one kind of metal oxide selected from the group of elements consisting of silicon, titanium, zirconium, tin, aluminum, tungsten, and antimony, and a silane compound having at least one kind of functional group selected from an alkyl group, an allyl group, an alkoxy group, a methacryloxy group, an acryloxy group, an epoxy group, an amino group, an isocyanato group, and a mercapto group, and hydrolyzates thereof.

The hard coat composition may include a curing agent with the object of promoting curing. Specific examples of the curing agent include inorganic and organic acids, amines, metal complexes, organic acid metal salts, metal chlorides, and the like. A solvent may be used for preparing the hard coat composition. Specific examples of the solvent include water, alcohols, ethers, ketones, esters, and the like.

The hard coating layer is formed by coating a hard coat composition on the surface of the molded product by a known coating method such as spin coating or dip coating and then curing the hard coat composition. Examples of the curing method include heat curing or a curing method using energy ray irradiation such as ultraviolet rays or visible light. In a case where heating and curing is carried out, the heating and curing is preferably carried out at 80° C. to 120° C. for 1 to 4 hours. In order to suppress the occurrence of interference fringes, it is preferable that the difference between the refractive index of the hard coating layer and the refractive index of the molded product is in the range of ±0.1.

Before applying the hard coating layer, it is preferable that the surface of the base material is subjected to ultrasonic cleaning with an alkaline aqueous solution so as to satisfy the following conditions (a) to (d).

(a) the alkaline aqueous solution is 5 to 40% sodium hydroxide or potassium hydroxide an aqueous solution, (b) the treatment temperature of the alkaline aqueous solution is 30 to 60° C., (c) the treatment time is 3 to 5 minutes, (d) the frequency of the ultrasonic waves is 20 to 30 kHz.

After washing with an alkali aqueous solution, the surface of the molded product may be washed with distilled water, alcohols such as isopropanol, or the like, and dried in the range of 50° C. to 80° C. for 5 minutes to 20 minutes.

The molded product obtained from the polymerizable composition of the present embodiment is excellent in alkali resistance, and the occurrence of clouding or the like is suppressed even after washing with an alkaline aqueous solution.

The anti-reflection layer is a coating layer provided on at least one surface of a molded product (lens) with the object of reducing the reflectance resulting from the difference in refractive index between air and the molded product, and greatly reducing the reflection of light on the surface of the plastic lens to increase the transmittance. The anti-reflection layer in the present embodiment includes a low refractive index film layer containing silicon oxide and a high refractive index film layer containing at least one kind of metal oxide selected from titanium oxide, zirconium oxide, aluminum oxide, zinc oxide, cerium oxide, antimony oxide, tin oxide, and tantalum oxide, and each layer may have a single layer or multilayer structure.

In a case where the anti-reflection layer has a multilayer structure, it is preferable that 5 to 7 layers are laminated. The film thickness is preferably 100 to 300 nm, and more preferably 150 to 250 nm. Examples of a method for forming a multilayer anti-reflection layer include a vacuum vapor deposition method, a sputtering method, an ion plating method, an ion beam assist method, a CVD method, and the like.

An anti-fog coating film layer, an anti-fouling layer, and a water-repellent layer may be formed on the anti-reflection film layer, as necessary. The method for forming the anti-fog coating layer, the anti-fouling layer, and the water-repellent layer is not particularly limited in terms of the treatment methods, the treatment materials, and the like as long as the method does not adversely affect the anti-reflection function, and it is possible to use known anti-fog coating treatment methods, anti-fouling treatment method, water-repellent treatment methods and materials. For example, examples of anti-fog coating and anti-fouling treatment methods include a method of covering the surface with a surfactant, a method of adding a hydrophilic film to the surface to make the surface water absorbent, a method of covering the surface with fine irregularities to increase water absorbency, a method of imparting water absorbency utilizing photocatalytic activity, a method of carrying out a super water-repellent treatment to prevent the adhesion of water drops, and the like. In addition, examples of the water-repellent treatment method include a method of forming a water-repellent treated layer by vapor deposition or sputtering of a fluorine-containing silane compound or the like, a method of dissolving the fluorine-containing silane compound in a solvent, followed by coating to form a water-repellent treated layer, or the like.

Each of these coating layers may be used together with an ultraviolet absorbing agent for the purpose of protecting the lenses and eyes from ultraviolet rays, an infrared absorber for the purpose of protecting the eyes from infrared rays, a light stabilizer or an antioxidant for the purpose of improving the weather resistance of the lens, dyes and pigments for the purpose of enhancing the fashionability of the lens, photochromic dyes and photochromic pigments, anti-static agents, and other known additive agents for improving the performance of the lens. Regarding the layer to be coated by coating, various kinds of leveling agents for the purpose of improving coatability may be used.

The plastic lens using the polymerizable composition for an optical material of the present embodiment may be dyed using a dye depending on the purpose in order to impart fashionability, a photochromic property, or the like, and used. Although the dyeing of the lens can be carried out by a known dyeing method, the dyeing is usually carried out by the following method.

In general, after immersing a lens material finished on a predetermined optical surface in a dyeing solution in which a dye to be used is dissolved or uniformly dispersed (dyeing step), the lens is heated as necessary to fix the dye (annealing step after dyeing). The dye used in the dyeing step is not particularly limited as long as it is a known dye, but an oil soluble dye or a disperse dye is usually used. The solvent used in the dyeing step is not particularly limited as long as the dye used is soluble or uniformly dispersible. In this dyeing step, a surfactant for dispersing the dye in the dyeing solution or a carrier for promoting dyeing may be added as necessary.

In the dyeing step, a dye bath is prepared by dispersing a dye and a surfactant added as necessary in water or a mixture of water and an organic solvent, the optical lens is immersed in the dye bath, and the dyeing is carried out for a predetermined time at a predetermined temperature. Although the dyeing temperature and time change depending on the desired coloring density, the temperature is usually 120° C. or less for several minutes to several tens of hours, and the dye concentration of the dye bath is 0.01 to 10% by weight. In addition, in a case where dyeing is difficult, the dyeing may be carried out under pressure.

The post-dyeing annealing step, which is carried out as necessary, is a step of subjecting the dyed lens material to a heat treatment. In the heat treatment, water remaining on the surface of the lens material dyed in the dyeing step is removed with a solvent or the like, the solvent is air-dried, and then the lens material is left for a predetermined time in a furnace such as an infrared heating furnace in an air atmosphere, or a resistance heating furnace. In the post-dyeing annealing step, moisture penetrating into the interior of the lens material at the time of dyeing is removed together with preventing discoloration in the dyed lens material (discoloration prevention treatment). In the present embodiment, in a case where no alcohol compound is included, the unevenness after dyeing is small.

In the present embodiment, a polarizing lens may be obtained by laminating a molded product obtained by curing the polymerizable composition of the present embodiment on at least one surface of a polarizing film. The manufacturing method is not particularly limited, and a known method may be adopted. Examples of the polarizing film include thermoplastic polyesters such as polyethylene terephthalate, polyvinyl alcohols, and the like.

Although the embodiments of the present invention are described above, these are examples of the present invention, and it is possible to adopt various configurations other than those described above as long as the effect of the present invention is not impaired.

For example, in the first embodiment, the thiol compound (A), the tin compound (B), and the isocyanate compound (C) may be mixed together.

That is, the haze value of the obtained polymerizable composition for an optical material is measured in accordance with JIS K 7136 (ISO 14782), and may be 0.05 or less, preferably 0.03 or less, more preferably 0.025 or less, even more preferably 0.015 or less, and particularly preferably 0.01 or less.

Here, in a case where the haze value of the polymerizable composition exceeds the above range, adjustments may be made such that the haze value falls within the above range by an operation such as adjusting the mixing time or stirring speed.

In the first to third embodiments, the aspect in which the total amount of the tin compound (B) is mixed with either the thiol compound (A) or the isocyanate compound (C) is described; however, a part of the tin compound (B) may be added to the thiol compound (A) and the remaining tin compound (B) may be added to the isocyanate compound (C).

In addition, in a case where at least two kinds of thiol compounds are used as the thiol compound (A), it is possible to add the tin compound (B) to at least one thiol compound.

In addition, in the present embodiment, the tin compound (B) may also be mixed with other compounds by preparing a master batch of a tin compound (B) and a thiol compound (A) or an isocyanate compound (C) and mixing in other compounds.

EXAMPLE

A specific description will be given below regarding the present invention based on examples, but the present invention is not limited to these examples. Here, the haze value and impact resistance were measured by the following method.

Haze value: The haze value was measured according to JIS K 7136 (ISO 14782) standard using Haze Meter NDH 2000 manufactured by Nippon Denshoku Industries Co., Ltd. First, 4-mercaptomethyl-1,8-dimercapto-3,6-dithiaoctane was charged in a 10 mm square cell and zero point calibration was carried out. Next, the object for haze value measurement was charged in a 10 mm square cell and the haze value thereof was measured.

Impact Resistance (Falling Ball Test): 11 kinds of iron balls with different weights of 8 g, 16 g, 28 g, 33 g, 45 g, 67 g, 95 g, 112 g, 174 g, 226 g, and 534 g were dropped in order onto a lens with a center thickness of 0.3 mm, a diameter of 75 mm, and an S=−4.75 D shape, at the center of the lens, from the position of a height of 127 cm (50 inches) to test whether the lens was broken. Ten lenses were tested, for each lens the maximum value of the weights of iron balls with which the lens was not broken was obtained, and the average value of the maximum values of the ten lenses was determined as "the average value of the non-breaking weight". The impact resistance was evaluated using this average value.

Example 1

29.19 parts by weight of a mixture of 2,5-bis(isocyanatomethyl)-bicyclo[2.2.1]heptane and 2,6-bis(isocyanatomethyl)-bicyclo[2.2.1]heptane, 19.48 parts by weight of hexamethylene diisocyanate, 1.50 parts by weight of an ultraviolet absorbing agent (manufactured by Kyodo Chemical Co., Ltd., trade name VIOSORB 583), and 0.10 parts by weight of an internal release agent (acidic phosphate ester, manufactured by Stepan Company, trade name Zelec UN) were mixed and dissolved at 20° C. Furthermore, 23.48 parts by weight of pentaerythritol tetrakis (3-mercaptopropionate) were added and mixed and dissolved at 15° C. to obtain a first mixed solution.

27.85 parts by weight of 4-mercaptomethyl-1,8-dimercapto-3,6-dithiaoctane, and 0.04 parts by weight of Nestin P manufactured by Honjo Chemical Corporation, (Lot 50607, a mixture of 99.8% of dimethyl tin dichloride and 0.2% of dibutyl tin dichloride) as a catalyst were mixed at 25° C. for 30 minutes to obtain a second mixed solution. The haze value of the obtained second mixed solution was measured and found to be 0.035.

Then, the first mixed solution and the second mixed solution were mixed at 15° C. to obtain a homogeneous solution. This mixed solution was degassed at 400 Pa for 1 hour and then filtered using a 1 μm PTFE filter and injected into a mold formed of a glass mold and tape. The mold was placed in a polymerization oven and polymerized by gradually raising the temperature from 25° C. to 120° C. over 21 hours. After completion of the polymerization, the mold was taken out of the oven. The releasability of the molded product from the mold was good. The obtained molded product was subjected to an annealing treatment at 130° C. for 2 hours.

The falling ball test was performed on the molded product, and the average value of the non-breaking weight was found to be 61 g.

The results are shown in Table 1.

Example 2

The same procedure as in Example 1 was carried out except that 27.85 parts by weight of 4-mercaptomethyl-1,8-dimercapto-3,6-dithiaoctane and 0.04 parts by weight of Nestin P manufactured by Honjo Chemical Corporation, (Lot 50607, a mixture of 99.8% of dimethyl tin dichloride and 0.2% of dibutyl tin dichloride) were mixed at 25° C. for 1 hour to obtain a second mixed solution. Here, the haze value of the obtained second mixed solution was measured and found to be 0.015. The falling ball test was performed on the obtained molded product, and the average value of the non-breaking weight was found to be 81 g. The results are shown in Table 1.

Example 3

The same procedure as in Example 1 was carried out except that 27.85 parts by weight of 4-mercaptomethyl-1,8-dimercapto-3,6-dithiaoctane and 0.04 parts by weight of Nestin P manufactured by Honjo Chemical Corporation, (Lot 50607, a mixture of 99.8% of dimethyl tin dichloride and 0.2% of dibutyl tin dichloride) were mixed at 25° C. for 2 hours to obtain a second mixed solution. Here, the haze value of the obtained second mixed solution was measured and found to be 0.00. The falling ball test was performed on the obtained molded product, and the average value of the non-breaking weight was found to be 83 g. The results are shown in Table 1.

Example 4

The same procedure as in Example 1 was carried out except that 27.85 parts by weight of 4-mercaptomethyl-1, 8-dimercapto-3,6-dithiaoctane and 0.04 parts by weight of Nestin P manufactured by Honjo Chemical Corporation, (Lot 50607, a mixture of 99.8% of dimethyl tin dichloride and 0.2% of dibutyl tin dichloride) were mixed at 25° C. for 24 hours to obtain a second mixed solution. Here, the haze value of the obtained second mixed solution was measured and found to be 0.00. The falling ball test was performed on the obtained molded product, and the average value of the non-breaking weight was found to be 84 g. The results are shown in Table 1.

Example 5

29.19 parts by weight of a mixture of 2,5-bis(isocyanatomethyl)-bicyclo[2.2.1]heptane and 2,6-bis(isocyanatomethyl)-bicyclo[2.2.1]heptane, 19.48 parts by weight of hexamethylene diisocyanate, 1.50 parts by weight of an ultraviolet absorbing agent (manufactured by Kyodo Chemical Co., Ltd, trade name VIOSORB 583), and 0.10 parts by weight of an internal release agent (acidic phosphate ester, manufactured by Stepan Company, trade name Zelec UN) were mixed and dissolved at 20° C. for 1 hour.

The haze value of the obtained mixed solution was measured and found to be 0.00. Furthermore, 23.48 parts by weight of pentaerythritol tetrakis (3-mercaptopropionate) were added and mixed and dissolved at 15° C. to obtain a first mixed solution. The haze value of the obtained first mixed solution was measured and found to be 0.00.

27.85 parts by weight of 4-mercaptomethyl-1,8-dimercapto-3,6-dithiaoctane and 0.04 parts by weight of Nestin P manufactured by Honjo Chemical Corporation, (Lot 50607, a mixture of 99.8% of dimethyl tin dichloride and 0.2% of dibutyl tin dichloride) as a catalyst were mixed at 25° C. for 30 minutes to obtain a second mixed solution. The haze value of the obtained second mixed solution was measured and found to be 0.035.

Then, the first mixed solution and the second mixed solution were mixed at 15° C. to obtain a homogeneous solution. The haze value of the obtained mixed solution was measured and found to be 0.035. This mixed solution was degassed at 400 Pa for 1 hour and then filtered using a 1 μm PTFE filter and injected into a mold formed of a glass mold and tape. The mold was placed in a polymerization oven and polymerized by gradually raising the temperature from 25° C. to 120° C. over 21 hours. After completion of the polymerization, the mold was taken out of the oven. The releasability of the molded product from the mold was good. The obtained molded product was subjected to a further annealing treatment at 130° C. for 2 hours.

The falling ball test was performed on the molded product, and the average value of the non-breaking weight was found to be 61 g.

The results are shown in Table 1.

Example 6

The same procedure as in Example 5 was carried out except that 27.85 parts by weight of 4-mercaptomethyl-1,8-dimercapto-3,6-dithiaoctane and 0.04 parts by weight of Nestin P manufactured by Honjo Chemical Corporation, (Lot 50607, a mixture of 99.8% of dimethyl tin dichloride and 0.2% of dibutyl tin dichloride) were mixed at 25° C. for 1 hour to obtain a second mixed solution. Here, the haze value of the obtained second mixed solution was measured and found to be 0.015. In addition, the haze value of the mixed solution obtained by mixing the first mixed solution and the second mixed solution was measured and found to be 0.015. In addition, the falling ball test was performed on the obtained molded product, and the average value of the non-breaking weight was found to be 81 g. The results are shown in Table 1.

Example 7

The same procedure as in Example 5 was carried out except that 27.85 parts by weight of 4-mercaptomethyl-1, 8-dimercapto-3,6-dithiaoctane and 0.04 parts by weight of Nestin P manufactured by Honjo Chemical Corporation, (Lot 50607, a mixture of 99.8% of dimethyl tin dichloride and 0.2% of dibutyl tin dichloride) were mixed at 25° C. for 2 hours to obtain a second mixed solution. Here, the haze value of the obtained second mixed solution was measured and found to be 0.00. In addition, the haze value of the mixed solution obtained by mixing the first mixed solution and the second mixed solution was measured and found to be 0.00. In addition, the falling ball test was performed on the obtained molded product, and the average value of the non-breaking weight was found to be 83 g. The results are shown in Table 1.

Example 8

The same procedure as in Example 5 was carried out except that 27.85 parts by weight of 4-mercaptomethyl-1, 8-dimercapto-3,6-dithiaoctane and 0.04 parts by weight of Nestin P manufactured by Honjo Chemical Corporation, (Lot 50607, a mixture of 99.8% of dimethyl tin dichloride and 0.2% of dibutyl tin dichloride) were mixed at 25° C. for 24 hours to obtain a second mixed solution. Here, the haze value of the obtained second mixed solution was measured and found to be 0.00. In addition, the haze value of the mixed solution obtained by mixing the first mixed solution and the second mixed solution was measured and found to be 0.00. In addition, the falling ball test was performed on the obtained molded product, and the average value of the non-breaking weight was found to be 84 g. The results are shown in Table 1.

Example 9

50.6 parts by weight of a mixture of 2,5-bis(isocyanatomethyl)-bicyclo[2.2.1]heptane and 2,6-bis(isocyanatomethyl)-bicyclo[2.2.1]heptane, 1.5 parts by weight of an ultraviolet absorbing agent (manufactured by Kyodo Chemical Co., Ltd., trade name VIOSORB 583), and 0.1 part by weight of an internal release agent (acidic phosphate ester, manufactured by Stepan Co., trade name Zelec UN) were mixed and dissolved at 20° C. over 2 hours. The haze value of the obtained mixed solution was measured and found to be 0.00. Furthermore, 23.9 parts by weight of pentaerythritol tetrakis (3-mercaptopropionate) was added thereto and mixed and dissolved at 15° C. to obtain a first mixed solution. The haze value of the obtained first mixed solution was measured and found to be 0.00.

25.5 parts by weight of 4-mercaptomethyl-1,8-dimercapto-3,6-dithiaoctane and 0.035 parts by weight of Nestin P manufactured by Honjo Chemical Corporation, (Lot 50607, a mixture of 99.8% of dimethyl tin dichloride and 0.2% of dibutyl tin dichloride) as a catalyst were mixed at 25° C. for 30 minutes to obtain a second mixed solution. The haze value of the obtained second mixed solution was measured and found to be 0.035.

Then, the first mixed solution and the second mixed solution were mixed at 15° C. to obtain a homogeneous solution. The haze value of the obtained mixed solution was measured and found to be 0.035. This mixed solution was degassed at 400 Pa for 1 hour and then filtered using a 1 µm PTFE filter and injected into a mold formed of a glass mold and tape. The mold was placed in a polymerization oven and polymerized by gradually raising the temperature from 25° C. to 120° C. over 21 hours. After completion of the polymerization, the mold was taken out of the oven. The releasability of the molded product from the mold was good. The obtained molded product was subjected to a further annealing treatment at 130° C. for 2 hours.

In addition, the falling ball test was performed on the molded product, and the average value of the non-breaking weight was found to be 34 g. The results are shown in Table 1.

Example 10

The same procedure as in Example 9 was carried out except that 25.5 parts by weight of 4-mercaptomethyl-1,8-dimercapto-3,6-dithiaoctane and 0.035 parts by weight of Nestin P manufactured by Honjo Chemical Corporation, (Lot 50607, a mixture of 99.8% of dimethyl tin dichloride and 0.2% of dibutyl tin dichloride) were mixed at 25° C. for 2 hours to obtain a second mixed solution. Here, the haze value of the obtained second mixed solution was measured and found to be 0.00. In addition, the haze value of the mixed solution obtained by mixing the first mixed solution and the second mixed solution was measured and found to be 0.00. In addition, the falling ball test was performed on the obtained molded product, the average value of the non-breaking weight was found to be 39 g. The results are shown in Table 1.

Comparative Example 1

50.7 parts by weight of m-xylylene diisocyanate, 1.5 parts by weight of an ultraviolet absorbing agent (manufactured by Kyodo Chemical Co., Ltd., trade name VIOSORB 583), and 0.1 parts by weight of an internal release agent (acidic phosphate ester, manufactured by Stepan Company, trade name Zelec UN) are mixed and dissolved at 20° C. over 2 hours to obtain a first mixed solution. The haze value of the obtained mixed solution was measured and found to be 0.01.

49.3 parts by weight of a polythiol compound which is a mixture of 5,7 (or 4,7 or 4,8)-dimercaptomethyl-1,11-mercapto-3,6,9-trithiaundecane and 0.008 parts by weight of Nestin P manufactured by Honjo Chemical Corporation, (Lot 50607, a mixture of 99.8% of dimethyl tin dichloride and 0.2% of dibutyl tin dichloride) as a catalyst were mixed at 25° C. for 30 minutes to obtain a second mixed solution. The haze value of the obtained second mixed solution was measured and found to be 0.060.

Then, the first mixed solution and the second mixed solution were mixed at 15° C. to obtain a homogeneous solution. The haze value of the obtained mixed solution was measured and found to be 0.070. This mixed solution was degassed at 400 Pa for 1 hour and then filtered using a 1 µm PTFE filter and injected into a mold formed of a glass mold and tape. The mold was placed in a polymerization oven and polymerized by gradually raising the temperature from 25° C. to 120° C. over 21 hours. After completion of the polymerization, the mold was taken out of the oven. The releasability of the molded product from the mold was good. The obtained molded product was subjected to a further annealing treatment at 130° C. for 2 hours.

The falling ball test was performed on the molded product, and the average value of the non-breaking weight was found to be 24 g. The results are shown in Table 1.

Example 11

The same procedure as in Comparative Example 1 was carried out except that 49.3 parts by weight of a polythiol compound which is a mixture of 5,7 (or 4,7 or 4,8)-dimercaptomethyl-1,11-mercapto-3,6,9-trithiaundecane and 0.008 parts by weight of Nestin P manufactured by Honjo Chemical Corporation, (Lot 50607, a mixture of 99.8% of dimethyl tin dichloride and 0.2% of dibutyl tin dichloride) were mixed at 25° C. for 24 hours to obtain a second mixed solution. Here, the haze value of the obtained second mixed solution was measured and found to be 0.00. In addition, the haze value of the mixed solution obtained by mixing the first mixed solution and the second mixed solution was measured and found to be 0.01. In addition, the falling ball test was performed on the obtained molded product, and the average value of the non-breaking weight was found to be 27 g. The results are shown in Table 1.

Comparative Example 2

26.17 parts by weight of a mixture of 2,5-bis(isocyanatomethyl)-bicyclo[2.2.1]heptane and 2,6-bis(isocyanatomethyl)-bicyclo[2.2.1]heptane, 17.46 parts by weight of hexamethylene diisocyanate, 1.50 parts by weight of an ultraviolet absorbing agent (manufactured by Kyodo Chemical Co., Ltd., trade name VIOSORB 583), 0.10 parts by weight of an internal release agent (acid phosphate ester, trade name Zelec UN, manufactured by Stepan Co.) were mixed and dissolved at 20° C. over 1 hour to obtain a first mixed solution. The haze value of the obtained first mixed solution was measured and found to be 0.00.

56.37 parts by weight of pentaerythritol tetrakis (2-mercaptopropionate) and 0.04 parts by weight of Nestin P manufactured by Honjo Chemical Corporation, (Lot 50607, a mixture of 99.8% of dimethyl tin dichloride and 0.2% of dibutyl tin dichloride) as a catalyst were mixed at 25° C. for 3 hours to obtain a second mixed solution. The haze value of the obtained second mixed solution was measured and found to be 0.060.

Then, the first mixed solution and the second mixed solution were mixed at 15° C. to obtain a homogeneous solution. The haze value of the obtained mixed solution was measured and found to be 0.060. This mixed solution was degassed at 400 Pa for 1 hour and then filtered using a 1 µm PTFE filter and injected into a mold formed of a glass mold and tape. The mold was placed in a polymerization oven and polymerized by gradually raising the temperature from 25° C. to 120° C. over 21 hours. After completion of the polymerization, the mold was taken out of the oven. The releasability of the molded product from the mold was good. The obtained molded product was subjected to a further annealing treatment at 130° C. for 2 hours.

The falling ball test was performed on the molded product, and the average value of the non-breaking weight was found to be 68 g. The results are shown in Table 1.

Example 12

The same procedure as in Comparative Example 2 was carried out except that 56.37 parts by weight of pentaerythritol tetrakis (2-mercaptopropionate) and 0.04 parts by weight of Nestin P manufactured by Honjo Chemical Corporation, (Lot 50607, a mixture of 99.8% of dimethyl tin dichloride and 0.2% of dibutyl tin dichloride) were mixed at 25° C. for 24 hours to obtain a second mixed solution. Here, the haze value of the obtained second mixed solution was measured and found to be 0.00. In addition, the haze value of the mixed solution obtained by mixing the first mixed solution and the second mixed solution was measured and found to be 0.00.

In addition, the falling ball test was performed on the obtained molded product, and the average value of the non-breaking weight was found to be 74 g. The results are shown in Table 1.

TABLE 1

| | Polymerizable composition monomer | | | | Composition | | Haze value | | | |
| --- | --- | --- | --- | --- | --- | --- | --- | --- | --- | --- |
| | | | | | | | | | Mixed solution of | |
| | Thiol | Isocyanate | Catalyst | Additive | First mixed solution | Second mixed solution | First mixed solution | Second mixed solution | first mixed solution and second mixed solution | Falling ball test [g] |
| Example 1 | a1, a2 | c1, c2 | b1 | d1, e1 | a2, c1, c2, d1, e1 | a1, b1 | — | 0.035 | — | 61 |
| Example 2 | a1, a2 | c1, c2 | b1 | d1, e1 | a2, c1, c2, d1, e1 | a1, b1 | — | 0.015 | — | 81 |
| Example 3 | a1, a2 | c1, c2 | b1 | d1, e1 | a2, c1, c2, d1, e1 | a1, b1 | — | 0.00 | — | 83 |
| Example 4 | a1, a2 | c1, c2 | b1 | d1, e1 | a2, c1, c2, d1, e1 | a1, b1 | — | 0.00 | — | 84 |
| Example 5 | a1, a2 | c1, c2 | b1 | d1, e1 | a2, c1, c2, d1, e1 | a1, b1 | 0.00 | 0.035 | 0.035 | 61 |
| Example 6 | a1, a2 | c1, c2 | b1 | d1, e1 | a2, c1, c2, d1, e1 | a1, b1 | 0.00 | 0.015 | 0.015 | 81 |
| Example 7 | a1, a2 | c1, c2 | b1 | d1, e1 | a2, c1, c2, d1, e1 | a1, b1 | 0.00 | 0.00 | 0.00 | 83 |
| Example 8 | a1, a2 | c1, c2 | b1 | d1, e1 | a2, c1, c2, d1, e1 | a1, b1 | 0.00 | 0.00 | 0.00 | 84 |
| Example 9 | a1, a2 | c1 | b1 | d1, e1 | a2, c1, d1, e1 | a1, b1 | 0.00 | 0.035 | 0.035 | 34 |
| Example 10 | a1, a2 | c1 | b1 | d1, e1 | a2, c1, d1, e1 | a1, b1 | 0.00 | 0.00 | 0.00 | 39 |
| Comparative Example 1 | a3 | c3 | b1 | d1, e1 | c3, d1, e1 | a3, b1 | 0.01 | 0.060 | 0.070 | 24 |
| Example 11 | a3 | c3 | b1 | d1, e1 | c3, d1, e1 | a3, b1 | 0.01 | 0.00 | 0.01 | 27 |
| Comparative Example 2 | a2 | c1, c2 | b1 | d1, e1 | c1, c2, d1, e1 | a2, b1 | 0.00 | 0.060 | 0.060 | 68 |
| Example 12 | a2 | c1, c2 | b1 | d1, e1 | c1, c2, d1, e1 | a2, b1 | 0.00 | 0.00 | 0.00 | 74 | a1: 4-mercaptomethyl-1,8-dimercapto-3,6-dithiaoctane
a2: pentaerythritol tetrakis (3-mercaptopropionate)
a3: a mixture of 5,7 (or 4,7 or 4,8)-dimercaptomethyl-1,11-mercapto-3,6,9-trithiaundecane
b1: a mixture of 99.8% of dimethyl tin dichloride and 0.2% of dibutyl tin dichloride
c1: mixture of 2,5-bis(isocyanatomethyl)-bicyclo[2.2.1]heptane and 2,6-bis(isocyanatomethyl)-bicyclo[2.2.1]heptane
c2: hexamethylene diisocyanate
c3: m-xylylene diisocyanate
d1: ultraviolet absorbing agent (manufactured by Kyodo Chemical Co., Ltd., trade name VIOSORB 583)
e1: internal release agent (acidic phosphate ester, manufactured by Stepan Company, trade name Zelec UN)

This application claims priority based on Japanese patent application No. 2015-155710 filed on Aug. 6, 2015 and international application PCT/JP2015/072332 filed on Aug. 6, 2015, the contents of which are all incorporated herein.

The invention claimed is:

1. A process for producing a polymerizable composition for an optical material, comprising:
a step of mixing (A) at least one kind of thiol compound having at least two mercapto groups, (B) a tin compound represented by general formula (1), and (C) at least one kind of isocyanate compound having at least two isocyanato groups, to obtain a polymerizable composition for an optical material having a haze value of 0.05 or less, $$(R^4)_c\text{—Sn—}X_{4-c} \qquad (1)$$

wherein, in general formula (1), $R^4$ represents an alkyl group having 1 to 8 carbon atoms, X represents a fluorine atom, a chlorine atom, a bromine atom, or —O—C(=O)—$R^5$, $R^5$ represents an alkyl group having 1 to 11 carbon atoms, and c represents an integer of 1 to 3, and wherein the isocyanate compound (C) is at least one kind of alicyclic isocyanate, aliphatic isocyanate and heterocyclic isocyanate.

2. A process for producing a polymerizable composition for an optical material, the method comprising:
a step of mixing (A) at least one kind of thiol compound having at least two mercapto groups and (B) a tin compound represented by general formula (1); and
a step of mixing (C) at least one kind of isocyanate compound having at least two isocyanato groups and the mixed solution obtained in the above step to obtain a polymerizable composition for an optical material,
wherein a haze value of the mixed solution including the component (A) and the component (B) is 0.05 or less, $$(R^4)_c\text{—Sn—}X_{4-c} \qquad (1)$$

wherein, in general formula (1), $R^4$ represents an alkyl group having 1 to 8 carbon atoms, X represents a fluorine atom, a chlorine atom, a bromine atom, or —O—C(=O)—$R^5$, $R^5$ represents an alkyl group having 1 to 11 carbon atoms, and c represents an integer of 1 to 3, and wherein the isocyanate compound (C) is at least one kind of alicyclic isocyanate, aliphatic isocyanate and heterocyclic isocyanate.

3. A process for producing a polymerizable composition for an optical material, the method comprising:
a step of mixing (B) a tin compound represented by general formula (1) and (C) at least one kind of isocyanate compound having at least two isocyanato groups; and
a step of mixing the mixed solution obtained in the above step and (A) at least one kind of thiol compound having at least two mercapto groups to obtain a polymerizable composition for an optical material,
wherein a haze value of the mixed solution including the component (B) and the component (C) is 0.05 or less,

(1)

wherein, in general formula (1), $R^4$ represents an alkyl group having 1 to 8 carbon atoms, X represents a fluorine atom, a chlorine atom, a bromine atom, or —O—C(=O)—$R^5$, $R^5$ represents an alkyl group having 1 to 11 carbon atoms, and c represents an integer of 1 to 3, and
wherein the isocyanate compound (C) is at least one kind of alicyclic isocyanate, aliphatic isocyanate and heterocyclic isocyanate.

4. The process for producing a polymerizable composition for an optical material according to claim 1,
wherein the isocyanate compound (C) includes at least one kind of compound selected from 1,6-hexamethylene diisocyanate, 1,5-pentamethylene diisocyanate, m-xylylene diisocyanate, isophorone diisocyanate, 1,3-bis(isocyanatomethyl)cyclohexane, 1,4-bis(isocyanatomethyl)cyclohexane, dicyclohexyl methane diisocyanate, 2,5-bis(isocyanatomethyl)bicyclo-[2.2.1]-heptane, and 2,6-bis(isocyanatomethyl)bicyclo-[2.2.1]-heptane.

5. The process for producing a polymerizable composition for an optical material according to claim 1,
wherein the thiol compound (A) includes at least one kind of compound selected from 4,6-bis(mercaptomethylthio)-1,3-dithiane, 2-(2,2-bis(mercaptomethylthio)ethyl)-1,3-dithietane, pentaerythritol tetrakis (3-mercaptopropionate), pentaerythritol tetrakis (2-mercaptoacetate), trimethylolpropane tris(3-mercaptopropionate), trimethylolpropane tris(2-mercaptoacetate), 4-mercaptomethyl-1,8-dimercapto-3,6-dithiaoctane, 2,5-bismercaptomethyl-1,4-dithiane, 1,1,3,3-tetrakis (mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, ethylene glycol bis(3-mercaptopropionate), diethylene glycol bis(3-mercaptopropionate), ethylene glycol bis(2-mercaptoacetate), and diethylene glycol bis(2-mercaptoacetate).

6. A polymerizable composition for an optical material produced by the process according to claim 1,
wherein the polymerizable composition for an optical material has a haze value of 0.05 or less.

7. A polymerizable composition for an optical material produced by the process according to claim 2.

8. A polymerizable composition for an optical material produced by the process according to claim 3.

9. The polymerizable composition for an optical material according to claim 6,
wherein the isocyanate compound (C) includes at least one kind of compound selected from 1,6-hexamethylene diisocyanate, 1,5-pentamethylene diisocyanate, m-xylylene diisocyanate, isophorone diisocyanate, 1,3-bis(isocyanatomethyl)cyclohexane, 1,4-bis(isocyanatomethyl)cyclohexane, dicyclohexyl methane diisocyanate, 2,5-bis(isocyanatomethyl)bicyclo-[2.2.1]-heptane, and 2,6-bis(isocyanatomethyl)bicyclo-[2.2.1]-heptane.

10. The polymerizable composition for an optical material according to claim 9,
wherein the isocyanate compound (C) includes at least one kind of compound selected from 1,6-hexamethylene diisocyanate, 2,5-bis(isocyanatomethyl)bicyclo-[2.2.1]-heptane, and 2,6-bis(isocyanatomethyl)bicyclo-[2.2.1]-heptane.

11. The polymerizable composition for an optical material according to claim 6,
wherein the thiol compound (A) includes at least one kind of compound selected from 4,6-bis(mercaptomethylthio)-1,3-dithiane, 2-(2,2-bis(mercaptomethylthio)ethyl)-1,3-dithietane, pentaerythritol tetrakis (3-mercaptopropionate), pentaerythritol tetrakis (2-mercaptoacetate), trimethylolpropane tris(3-mercaptopropionate), trimethylolpropane tris(2-mercaptoacetate), 4-mercaptomethyl-1,8-dimercapto-3,6-dithiaoctane, 2,5-bismercaptomethyl-1,4-dithiane, 1,1,3,3-tetrakis (mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, ethylene glycol bis(3-mercaptopropionate), diethylene glycol bis(3-mercaptopropionate), ethylene glycol bis(2-mercaptoacetate), and diethylene glycol bis(2-mercaptoacetate).

12. The polymerizable composition for an optical material according to claim 11,
wherein the thiol compound (A) includes at least one kind of compound selected from 4-mercaptomethyl-1,8-dimercapto-3,6-dithiaoctane, and pentaerythritol tetrakis (3-mercaptopropionate).

13. A method for manufacturing a plastic lens comprising:
a step of injecting the polymerizable composition for an optical material according to claim 6 into a lens-casting mold;
a step of polymerizing the polymerizable composition for an optical material; and
a step of releasing the resin obtained in the above step from the lens-casting mold to obtain a molded product.

14. A molded product obtained by curing the polymerizable composition for an optical material according to claim 6.

15. An optical material comprised of the molded product according to claim 14.

16. A lens comprised of the optical material according to claim 15.

17. A spectacle lens comprised of the lens according to claim 16.

18. A spectacle lens comprising:
the lens according to claim 16; and
a hard coating layer and/or an anti-reflection coating layer formed on at least one surface of the lens.

* * * * *